2,991,524
TARP HOLD-DOWN STRAP

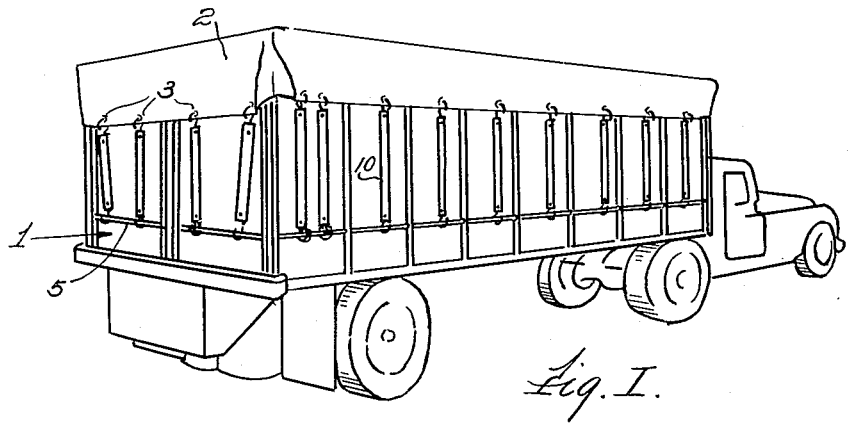

Harold L. Dobrikin, Chicago, Ill., assignor, by mesne assignments, to Berg Airlectro Products Co., Chicago, Ill., a corporation of Illinois
Filed May 22, 1957, Ser. No. 660,925
1 Claim. (Cl. 24—73)

This invention relates generally to fasteners and has for one purpose the provision of a tarp fastener useable with truck trailers and the like.

Another purpose is to provide a fastener for tarps used upon trucks and truck trailers.

Another purpose is to provide a fastener of the type described which shall be extensible to the extent required in use but which shall at the same time be prevented from expanding beyond a predetermined length.

Another purpose is to provide a stretchable tarp fastener having means effective to prevent the stretching thereof beyond a predetermined length.

Another purpose is to provide a fastener which shall be economically produced, effective in operation and which shall enjoy an increased life.

Other purposes will appear from time to time during the course of the specification and claim.

I illustrate my invention more or less diagrammatically in the accompanying drawings wherein:

FIGURE 1 is an illustration in perspective of my invention as installed on a truck trailer.

FIGURE 2 is a side elevation, on an enlarged scale, of my invention.

FIGURE 3 is a lateral cross-sectional view taken on the line 3—3 of FIGURE 2.

FIGURE 4 is a detail view in partial cross-section and illustrating an end portion of my invention.

FIGURE 5 is a view similar to that of FIGURE 2 and illustrating my invention is installed.

FIGURE 6 is a view similar to that of FIGURE 5 and illustrating my invention under increased tension.

Like parts are indicated by like numerals throughout the specification and claim.

Referring now to the drawings, and particularly to FIGURE 1 thereof, the numeral 1 generally indicates a truck body or truck trailer body. It will be understood that the body 1 is of the type over the top of which is commonly employed a canvas cover or tarp, shown at 2. The tarp 2 has along its edges a line of eyelets 3. The body 1 has along its lower outer edges a bar or rod or series of catches. As illustrated, for example, a bar 5 may be employed.

Referring now to FIGURE 2, it will be observed that the structure of my invention includes a central, elongated generally rectilinear elastic or expansible member 10. The member 10 may be formed of a variety of materials having the properties for example of rubber and it may conveniently be formed of rubber. As best seen in FIGURE 3, while the element or member 10 of my invention may take a plurality of elongated forms, I provide an elongated tubular configuration having a continuous wall forming a passage therein which may for example be generally oval in lateral cross-section.

The member 10 has its ends laterally apertured as at 11, 12. Extending through the apertures 11 and 12 are pins or bolts or rivets 14. Each of the pin members 14 has rotatably secured thereto a hook member 16. As seen in FIGURE 2, a hook member 16 extends outwardly in opposite directions from the opposite ends of the member 10. The hooks 16 may have their inner ends 17 secured to the pins 14 in any suitable manner. In FIGURE 4, for example, I illustrate the hook inner portion 17 as simply rotatively surrounding the pin 14.

Within the hollow central passage of the extensible tubular member 10, I position a non-stretchable member 20 which may, for example, be a wire cable. The cable 20 has its opposite ends secured to the pins 14 positioned in the opposite ends of member 10 as best seen in FIGURE 4 and indicated therein at 21. It will be observed that the cable 20 is of greater length than the member 10, and, when the member 10 is in its free state as illustrated in FIGURE 2, the member 20 assumes a folded or crimped position, the hollow passage or central portion of the tube 10 being effective to permit the same. FIGURE 5 illustrates the structure of my invention and the effect of the elements thereof upon being subjected to unintended movement of the tarp secured thereby resulting in a stretching of the member 10.

Whereas I have described and claimed a practical and operative device, nevertheless, many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

While the tarp fastener of my invention may be formed of a variety of lengths without departing from the nature and scope of my invention, I find it convenient to provide an overall length of approximately 46 inches including the members 10 and 16 in their free or unstretched states as illustrated in FIGURE 2. Similarly, I find it preferable to form the cable 20 of a length of approximately 10 inches longer than that of the free or unstretched length of member or element 10. Since a standard spacing between a hook or rod 5 on a truck or trailer and the tarp edge thereabove approximates 54 inches it will be realized that the stretchable element or member 10 of my invention will be stretched approximately 8 inches when initially installed on such a truck or truck trailer or body. Thus the cable 20 will still be approximately 2 inches greater in length than the stretched or the installed length of the member 10.

As the trailer or truck body moves along the highway or when traveling in storms or when otherwise subjected to the action of wind, the tarp is often lifted and urged upwardly, against the action of the tarp fasteners employed therewith. In such cases it has been possible in the past to stretch the tarp fastener beyond its limits of stretchability and to thereby damage and break the fasteners. Such a situation grows worse where the breaking of a fastener permits a greater amount of air to enter beneath the tarp and thereby permits a greater force to be exerted against the remaining fasteners tending to damage or break them by stretching them beyond their limits. As will be readily understood, the tarp fastener of my invention, while subject to a predetermined amount of stretching beyond that necessary to fasten the tarp, is prevented automatically and positively from stretching beyond the limit established by the length of the non-stretchable cable element 20 as indicated above. In this respect, I find it preferable to provide for approximately 2 inches of extra stretch or extension of the member 10.

I claim:

A fastener comprising an elongated tube of non-metallic stretchable elastic material, said tube having a continuous wall forming a hollow passage open at each end, a pair of pin elements extending transversely of said tube through said wall and across said passage so as to be anchored in said tube wall, one of said pin elements being disposed adjacent each of said ends, a hook element secured to each of said pin elements and extending outwardly beyond the opposite ends of said elastic tube, a non-stretchable flexible member positioned within said passage and secured at its opposite ends to said pins, said non-stretchable member having a greater length than the unstretched length of said tube and having a greater length than the normal stretched length of said tube when said fastener is installed and limiting the elongation of said tube upon further stretching of the latter.

References Cited in the file of this patent

UNITED STATES PATENTS

| | | |
|---|---|---|
| 871,703 | Keith | Nov. 19, 1907 |
| 2,067,763 | Holan | Jan. 12, 1937 |
| 2,091,457 | Sauer | Aug. 31, 1937 |
| 2,117,322 | Hillman | May 17, 1938 |
| 2,299,160 | MacPherson | Oct. 20, 1942 |
| 2,465,621 | Wheeler | Mar. 29, 1949 |
| 2,727,621 | Fillion | Dec. 20, 1955 |

FOREIGN PATENTS

| | | |
|---|---|---|
| 28,489 | Great Britain | Sept. 1, 1910 |
| 426,810 | Great Britain | Apr. 10, 1935 |